US008767004B2

(12) United States Patent
Longhurst

(10) Patent No.: US 8,767,004 B2
(45) Date of Patent: Jul. 1, 2014

(54) INTERPOLATION OF COLOR GAMUT FOR DISPLAY ON TARGET DISPLAY

(75) Inventor: Peter W. Longhurst, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 261 days.

(21) Appl. No.: 13/413,292

(22) Filed: Mar. 6, 2012

(65) Prior Publication Data

US 2012/0229495 A1 Sep. 13, 2012

Related U.S. Application Data

(60) Provisional application No. 61/450,590, filed on Mar. 8, 2011.

(51) Int. Cl.
G09G 5/02 (2006.01)
H04N 9/67 (2006.01)
H04N 1/60 (2006.01)
G09G 5/377 (2006.01)

(52) U.S. Cl.
CPC .............. H04N 9/67 (2013.01); *G09G 5/377* (2013.01); *G09G 2340/10* (2013.01); H04N 1/6058 (2013.01); *G09G 2340/06* (2013.01); *G09G 5/026* (2013.01)
USPC ............................ 345/590; 345/589; 345/604

(58) Field of Classification Search
CPC ............ G09G 2340/06; G06T 3/4007; H04N 1/6058; H04N 1/6066
See application file for complete search history.

(56) References Cited

U.S. PATENT DOCUMENTS

| | | | | |
|---|---|---|---|---|
| 6,335,734 B1 * | 1/2002 | Nagae et al. | .................. | 345/589 |
| 7,403,205 B2 * | 7/2008 | Zeng | .............................. | 345/590 |
| 7,414,631 B2 * | 8/2008 | Tin | ................................. | 345/590 |
| 7,483,486 B2 | 1/2009 | Mantiuk | | |
| 7,747,098 B2 | 6/2010 | Ward | | |
| 7,760,949 B2 | 7/2010 | Segall | | |
| 8,576,245 B2 * | 11/2013 | Hekstra et al. | ................ | 345/600 |
| 2008/0192819 A1 | 8/2008 | Ward | | |
| 2009/0322800 A1 | 12/2009 | Atkins | | |
| 2010/0157078 A1 | 6/2010 | Atanassov | | |
| 2010/0172411 A1 | 7/2010 | Efremov | | |

FOREIGN PATENT DOCUMENTS

| | | |
|---|---|---|
| WO | 2010024782 | 3/2010 |
| WO | 2010082692 | 7/2010 |
| WO | 2010/104624 | 10/2010 |
| WO | 2011/106247 | 9/2011 |
| WO | 2012/012489 | 1/2012 |

OTHER PUBLICATIONS

Ward, Greg, "A General Approach to Backwards-Compatible Delivery of High Dynamic Range Images and Video" Source International on Computer Graphics and Interactive Techniques archive ACM SIGGRAPH 2008, New York, USA.

(Continued)

*Primary Examiner* — Antonio A Caschera

(57) ABSTRACT

Output image data for display on a target display having a target gamut is generated from first and second input image data. The first and second input image data may be color timed for display on different types of display. Chromaticity values in the output image data may be generated by interpolation using an interpolation parameter derived from the target gamut and gamuts associated with the first and second image data.

23 Claims, 7 Drawing Sheets

(56) References Cited

OTHER PUBLICATIONS

Mantiuk, R., "Backward Compatible High Dynamic Range MPEG Video Compression" Proceedings of SIGGRAPH 2006.

Mantiuk, Radoslaw, et al., "Effective Compression of High Dynamic Range Images" 2005, pp. 13-18, In Proc. of EURASIP'05.

Banterle, F., et al., "Inverse Tone Mapping" Proceedings of the 4th International Conference on Computer Graphics and Interactive Techniques, pp. 349-356, published in 2006.

Banterle, F., et al., "High Dynamic Range Imaging and Low Dynamic Range Expansion for Generating HDR Content" Computer Graphics Forum Journal, vol. 28, No. 8, p. 2343-2367, 2009.

Jinno, T., et al., "Acquisition and Encoding of High Dynamic Range Images Using Inverse Tone Mapping" Image Processing, 2007, IEEE International Conference, vol. 4, pp. IV-181-IV-184.

Mantiuk, Rafal, et al., "High Dynamic Range Image and Video Compression—Fidelity Matching Human Visual Performance" Proc. of IEEE International Conference on Image Processing 2007, pp. 9-12.

Myzkowski, K., et al., "High Dynamic Range Video" Synthesis Lectures on Computer Graphics and Animation 2008, 158 pages.

Akyuz, Ahmet Oguz, "Optimizing the High Dynamic Range Imaging Pipeline" 2007, 256 pages.

Mantiuk, Rafal, et al., "High Dynamic Range Imaging Pipeline: Perception-Motivated Representation of Visual Content" Proceedings of SPIE 2007, vol. 6492, Issue: Section 2, Published: SPIE.

Xu, Ruifeng, "Real-Time Realistic Rendering and High Dynamic Range Image Display and Compression" University of Central Florida, 2005, 192 pages.

\* cited by examiner

INTERPOLATION OF COLOR GAMUT FOR DISPLAY ON TARGET DISPLAY

CROSS-REFERENCE TO RELATED APPLICATIONS

This application claims priority to U.S. Provisional Patent Application No. 61/450,590 filed 8 Mar. 2011, which is incorporated herein by reference in its entirety.

TECHNICAL FIELD

This invention relates to image data processing. The invention relates specifically to methods and apparatus for adjusting pixel values in image data for display on specific target displays. The invention may be embodied, for example in televisions, computer displays, video players, and the like.

BACKGROUND

Commonly owned patent application No. 61/307547 entitled DISPLAY MANAGEMENT METHODS AND APPARATUS and No. 61/366899 entitled DISPLAY MANAGEMENT SERVER describe apparatus and methods for generating video data for display on a particular target display by interpolating/extrapolating from two video streams having the same content that have been prepared for viewing on different displays. Both of these applications are hereby incorporated herein by reference for all purposes. One issue when performing such interpolation is to determine what interpolation parameters to use. This, may depend on how 'close' the target display is to each of the displays for which the incoming video streams have been prepared.

Literature describing technology in the general field of this invention includes: WO2010082692A1; Ward, G., A general approach to backwards-compatible delivery of high dynamic range images and video, International Conference on Computer Graphics and Interactive Techniques archive ACM SIGGRAPH 2008 Article No.: 29 and Mantiuk et al. Backward Compatible High Dynamic Range MPEG Video Compression
Mantiuk et al. Effective Compression of High Dynamic Range Images; as well as the following patent literature:
WO2010024782A1
US20100157078A1
US20080192819A1
US20100172411A1
US20090322800A1
U.S. Pat. No. 7,747,098B2
U.S. Pat. No. 7,760,949B2
U.S. Pat. No. 7,483,486B2

SUMMARY OF THE INVENTION

The invention has various aspects. These include displays, image processing apparatus for use in conjunction with displays, and methods for preparing images for display on specific displays or types of display.

One aspect provides functional units that take two video signals as input, and perform interpolation/extrapolation on pixel values of the video signals to produce an output signal. The interpolation may be between values specifying luminance and/or chrominance for corresponding pixels of the two video signals. Such interpolation may be called 'color interpolation'. The functional units may be provided at various locations in a video pipeline between the creation and displaying of video content. The functional units may receive various inputs as described herein and may be configured to vary their operation based upon the inputs. Such functional units may be embedded in devices that handle video content such as displays, set-top boxes, video players, video recorders, video editors, video processors, video servers, video content creation tools, mobile devices, video editing stations, and the like.

Such functional units may be implemented by hardware devices, programmable data processors executing software (or firmware), configurable hardware (such as FPGAs) and suitable combinations thereof. Software that, when executed, causes a data processor to implement a functional unit as described herein may be of a wide variety of types including operating system software, image rendering software, video player software, image creation software tools, video processing software, and others.

Another aspect provides a video processing apparatus that is connectable upstream from a target video display and configured to receive first and second input video signals, and to combine the first and second video input signals to yield an output video signal having a gamut and/or tone adjusted to match capabilities of the target video display. The video processing apparatus may include a communication interface for communicating with the display and receiving from the display data indicative of the capabilities of the display.

Another aspect provides mapping for features of video signals implemented by methods and apparatus which are configured to select the mappings based at least in part on capabilities of a target display. The apparatus may determine capabilities of the target display, for example, based on user input, data relating to the target display (the data may be retrieved from or obtained from the target display itself, for example), inferred from behavior of the target display, or the like. In some embodiments the mapping comprises an interpolation/extrapolation between two video signals representing the same video images. The interpolation/extrapolation may be based on capabilities of the target display relative to capabilities associated with the two video signals.

Another aspect provides methods for generating output images for display on a target display associated with a target gamut. The images may be still images or frames of a video, for example. The methods comprise obtaining first and second image data depicting the image, the first and second image data respectively associated with first and second gamuts and determining primary interpolation lines through corresponding pairs of primaries of the first and second gamuts. The method generates first and second bracketing gamuts. The first and second bracketing gamuts have primaries on the primary interpolation lines. The first bracketing gamut contains the target gamut and the second bracketing gamut is contained within the target gamut. The method proceeds by generating a first interpolation parameter based on the locations of primaries of the bracketing gamuts along the primary interpolation lines and generating the output image by interpolating between chrominance values of the first and second image data using the first interpolation parameter.

Another aspect provides image processing apparatus comprising: an interpolator configured to generate chromaticity values for output image data by interpolating between corresponding chromaticity values for first and second input image data according to a first interpolation parameter. The apparatus includes an interpolation parameter calculator configured to determine the first interpolation parameter based on first and second gamuts respectively associated with the first and second image data and on a target gamut associated with a target display.

In some embodiments the interpolation parameter calculator is configured to determine the first interpolation parameter by: determining primary interpolation lines through corresponding pairs of primaries of the first and second gamuts; generating first and second bracketing gamuts, the first and second bracketing gamuts having primaries on the primary interpolation lines, the first bracketing gamut containing the target gamut and the second bracketing gamut contained within the target gamut; and generating the first interpolation parameter based on the locations of primaries of the bracketing gamuts along the primary interpolation lines.

In addition to the exemplary aspects and embodiments described above, further aspects and embodiments will become apparent by reference to the drawings and by study of the following detailed descriptions.

BRIEF DESCRIPTION OF THE DRAWINGS

Example embodiments are illustrated in the accompanying drawings which are illustrative and not restrictive.

DESCRIPTION OF THE INVENTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
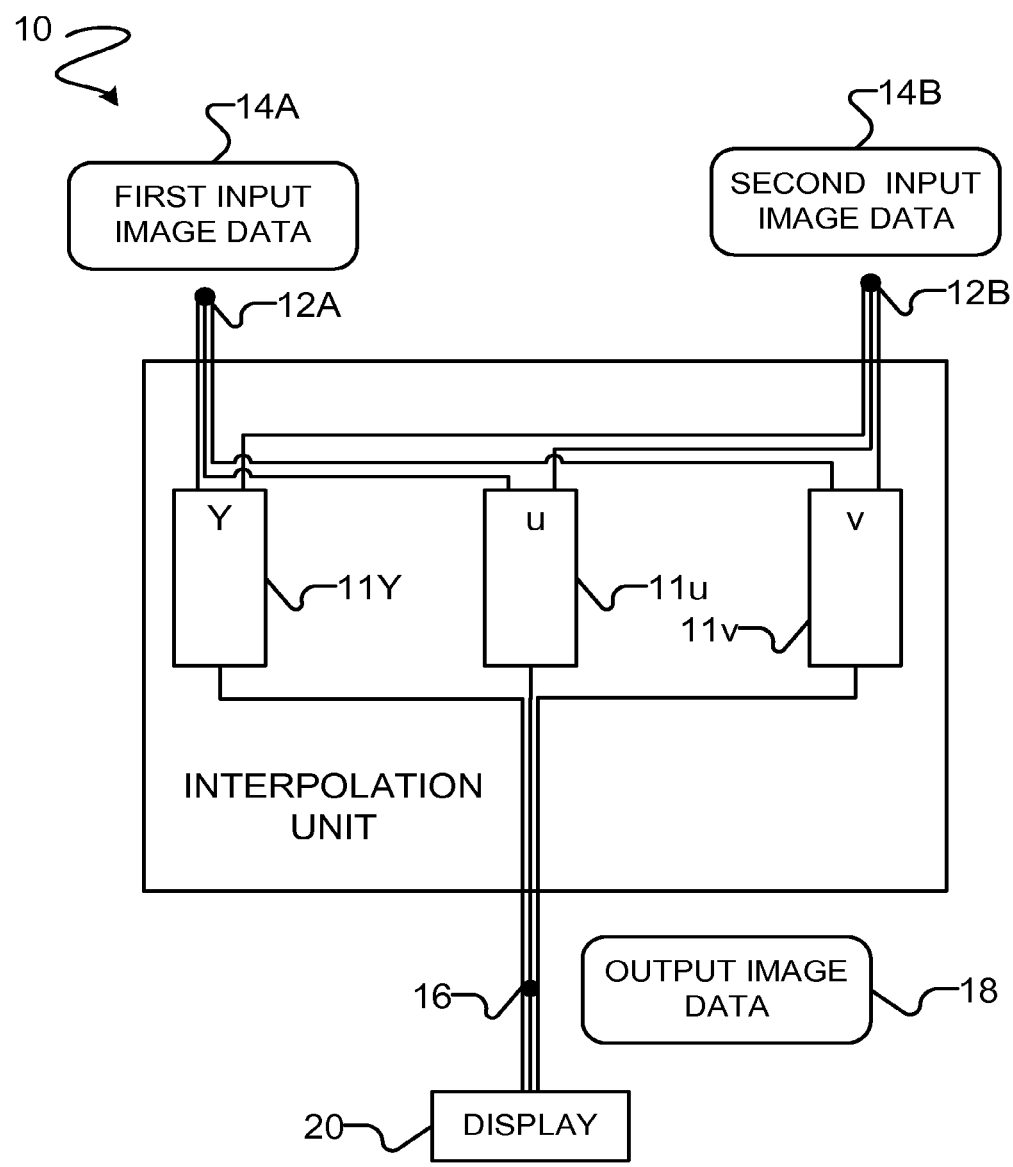
FIG. 1 is a block diagram illustrating an interpolation unit according to an example embodiment.

FIG. 1 shows an interpolation unit 10. Interpolation unit 10 has first and second inputs 12A and 12B for receiving first and second input image data 14A and 14B respectively. First and second input image data 14A and 14B depict the same content however pixel values may differ as between first input image data 14A and second input image data 14B. For example, tone mapping and/or specific chromaticity values may differ between for corresponding pixels of first and second input image data 14A and 14B.

It is not required that first and second inputs be physically distinct. It is possible but not necessary for first and second input image data 14A and 14B to be received at a common physical input. First and second input image data 14A and 14B may be provided in independently accessible data structures or may be provided in a data structure that contains both first and second input image data 14A and 14B. For example first and second input image data 14A and 14B could be coded and multiplexed together as a base and an enhancement layer respectively. A decoder may be provided upstream from inputs 12A and 12B so that pixel values for first and second input image data 14A and 14B are available within interpolation unit 10. In an example application the decoder is configured to: extract from a file or stream or other data container a base layer containing first input image data 14A; extract an enhancement layer that contains data indicative of differences between first and second input image data 14A and 14B from the file or stream; and recreate the second input image data 14B from the extracted first input image data 14A and the data of the enhancement layer.

In another example embodiment the decoder is configured to extract first input image data 14A from a file, stream or other data container and information that directly or indirectly specifies a transformation to be applied to color values (i.e. pixel values specifying chromaticity and/or luminance) of first input image data 14A to yield second input image data 14B. The decoder can then apply the transformation to obtain second input image data 14B. The information specifying the transformation may, for example, be associated as metadata with first input image data 14A.

Input image data 14A and 14B may, for example, comprise video data. Interpolation unit 10 has an output 16 which may be connected to deliver output image data 18 to a target display 20. Output image data 18 may, for example, comprise video data to be displayed on target display 20.

If input image data 14A and 14B are not already represented in a common color space then one or both of them are processed using a color space transformation so that they are represented in a common color space. The image data may be represented in any suitable color space. The log(Y)u'v' color space is an example color space that may be used. Other color spaces such as xyY, Lab, and IPT or even non-opponent color spaces, such as RGB or XYZ may also be used.

Interpolation unit 10 generates a pixel value for output image data 18 by interpolating between pixel values for corresponding pixels in first and second input image data 14A and 14B. In a simple example embodiment the interpolation is performed between a pixel value for a pixel at location (x, y) in first input image data 14A and a corresponding pixel value for a pixel at the corresponding location (x, y) in second input image data 14B. The pixel value may specify chrominance and/or luminance for the pixel in question. An output pixel value VOUT may be generated from corresponding pixel values VIN1 and VIN2 according to:

$$V_{OUT} = \alpha \times V_{IN1} + \beta \times V_{IN2} = \alpha \times V_{IN1} + (1-\alpha) \times V_{IN2} \quad (1)$$

where $\alpha$ and $\beta$ are weighting factors which may be called 'interpolation parameters' with $\alpha+\beta=1$. Where the luminance and chromaticity for a pixel are collectively represented by a triad of values then the interpolation may be performed according to Equation (1) for each of the values. The weighting factors $\alpha$ and $\beta$ for different ones of the values may be the same or different. Interpolation may be performed for each pixel of an image.

In some embodiments, interpolation unit 10 is configured to interpolate/extrapolate following perceptual curves. For example, the interpolation unit may be configured to interpolate/extrapolate on the logarithm of the luminance. In some embodiments, video data is converted into a perceptually uniform color space (such as, for example, IPT or Log Yuv) before performing interpolation/extrapolation.

In some embodiments, luminance and colour components are interpolated separately. Separate interpolation parameters may be used for different channels. For example, where interpolation is performed in a Log Yuv color space, one pair of interpolation parameters may be used for both color channels and a separate pair of interpolation parameters may be applied to the luminance channel. In other embodiments the same interpolation parameters are used for both colour and luminance channels.

For example, interpolation between two instances of video data may be performed according to the following equations:

$$Y_{OUT} = e^{(\alpha\, log(Y_{IN1}) + \beta\, log(Y_{IN2}))} \quad (2)$$

$$x_{OUT} = \alpha x_{IN1} + \beta x_{IN2} \quad (3)$$

$$y_{OUT} = \alpha y_{IN1} + \beta y_{IN2} \quad (4)$$

where: Y is a luminance coordinate in a color space such as Log Yxy or Log Y u'v'; the subscript IN1 (as in YIN1, for example) identifies data from the first input video signal; the subscript IN2 identifies data from the second input video signal; the subscript OUT identifies the output or target video signal; α and β, are interpolation parameters (typically with α+β=1); and x and y are chromaticity coordinates (for example, x and y in a LogYxy color space or u' and v' in a Log Yu'v' color space).

In the illustrated embodiment, interpolation unit 10 separately processes 3 different values for each pixel (e.g. two chromaticity values and one brightness value for each pixel of first and second input image data 14A and 14B are specified by three values as are the color and brightness of each pixel of output image data 18). In general, these values may be values for any color model.

It is convenient to use the example of a Yuv color model in which one value, Y, representing luminance and two values u, v representing chromaticity are specified for each pixel. In this case, interpolation unit 10 may have an interpolation sub-unit 11Y that processes a Y-channel, an interpolation sub-unit 11u that processes a u-channel and an interpolation sub-unit 11v that processes a v-channel.

Figure 1A:
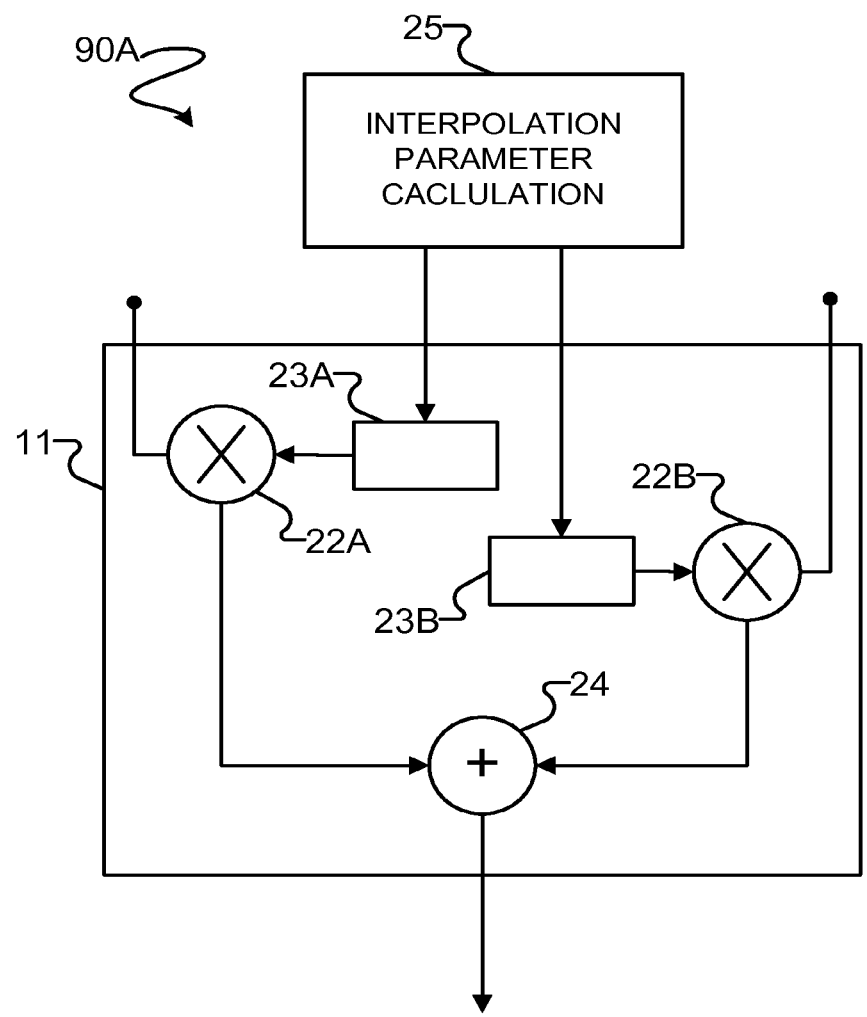
FIG. 1A is a schematic block diagram of one way to implement an interpolation module.

As shown in FIG. 1A, each sub-unit 11 of an interpolation module 90A has multipliers 22A and 22B that respectively multiply the corresponding pixel value from first and second input image data 14A and 14B by corresponding interpolation parameters from registers 23A and 23B. An adder 24 sums the results of the multiplications from multipliers 22A and 22B. The result is written as a pixel value of output image data 18.

The interpolation parameters are set by a circuit 25 that sets the interpolation parameters in registers 23A and 23B based on information regarding first image data 14A, second image data 14B and target display 20. The information may be derived from one or more of: analysis of first input image data 14A and second input image data 14B; metadata associated with one or both of first input image data 14A and second input image data 14B; user input provided by way of a user interface; information regarding capabilities of target display 20 retrieved by way of EDID, user input, or some other modality.

In some embodiments the interpolation parameters in registers 23A and 23B are preset to values appropriate for a specific target display 20 or type of target display 20 and specific types of input image data 14A and 14B. In some embodiments a user control or automatic control may select one from among a plurality of different sets of interpolation parameters to make available in registers 23A and 23B. The selection may be based, for example, on the nature of input image data 14A and 14B.

In some embodiments, the interpolation parameters in registers 23A and 23B are set once and not normally changed after that. In other embodiments circuit 25 performs analysis to determine appropriate values for the interpolation parameters periodically, on demand (e.g. when initiated by a user) or each time processing of a new input image data 14A and 14B is commenced. In yet other embodiments circuit 25 performs analysis to determine appropriate values for the interpolation parameters on a dynamic basis during processing of input image data 14A and 14B. For example circuit 25 may be configured to determine appropriate values for the interpolation parameters for each scene, group of frames or the like that are represented in input image data 14A and 14B.

Circuit 25, when present, may comprise a programmable data processor configured to execute software instructions which cause the processor to determine values for one or more interpolation parameters as described herein, logic circuits connected to determine values for one or more interpolation parameters as described herein or combinations thereof.

A problem addressed by certain embodiments of the invention is to determine appropriate values for interpolation parameters based on information regarding or associated with the first and second input image data 14A and 14B and capabilities of target display 20.

Although the invention is not so limited, in the following description of a first example embodiment, first and second input image data 14A and 14B and output image data 18 are all video data. First and second input image data 14A and 14B each contain the same content and have been color timed by a colorist (e.g. a person has viewed first and second input image data 14A and 14B on reference displays and has adjusted tone and/or chromaticity values using color grading tools for some or all pixels in some or all frames of the first and second image data 14A and 14B to achieve a desired appearance according to a creative intent). A difference between first and second input image data 14A and 14B is that each has been color timed for optimal display on a different specific target display, on a different type of target display, and/or for viewing under different ambient conditions. The capabilities of the displays for which first and second input image data 14A and 14B have been color timed and/or the ambient lighting conditions for which first and second input image data 14A and 14B have been color timed are different from those of target display 20 in at least some respects.

In a useful example embodiment, the first input image data 14A is a standard dynamic range (SDR) video and the second input image data 14B is a higher dynamic range (HDR) video. For example, the first input image data 14A may comprise video data in a Rec 709 format. Rec 709 is a video data format specified by ITU-R Recommendation BT.709, which is hereby incorporated herein by reference. For example, the second input image data 14B may be presented in a Visual Dynamic Range (VDR) format as described, for example, in co-owned PCT Application No. PCT/US2010/022700 for "EXTENDED DYNAMIC RANGE AND EXTENDED DIMENSIONALITY IMAGE SIGNAL CONVERSION AND/OR DELIVERY VIA LEGACY VIDEO INTERFACES" which is hereby incorporated herein by reference for all purposes. The VDR format can encode the full range of human vision. In the illustrated embodiment the second input image data 14B is encoded as a side channel of a stream carrying first input image data 14A. In the alternative, second input image data 14B may be separate from first input image data 14A.

Figure 2:
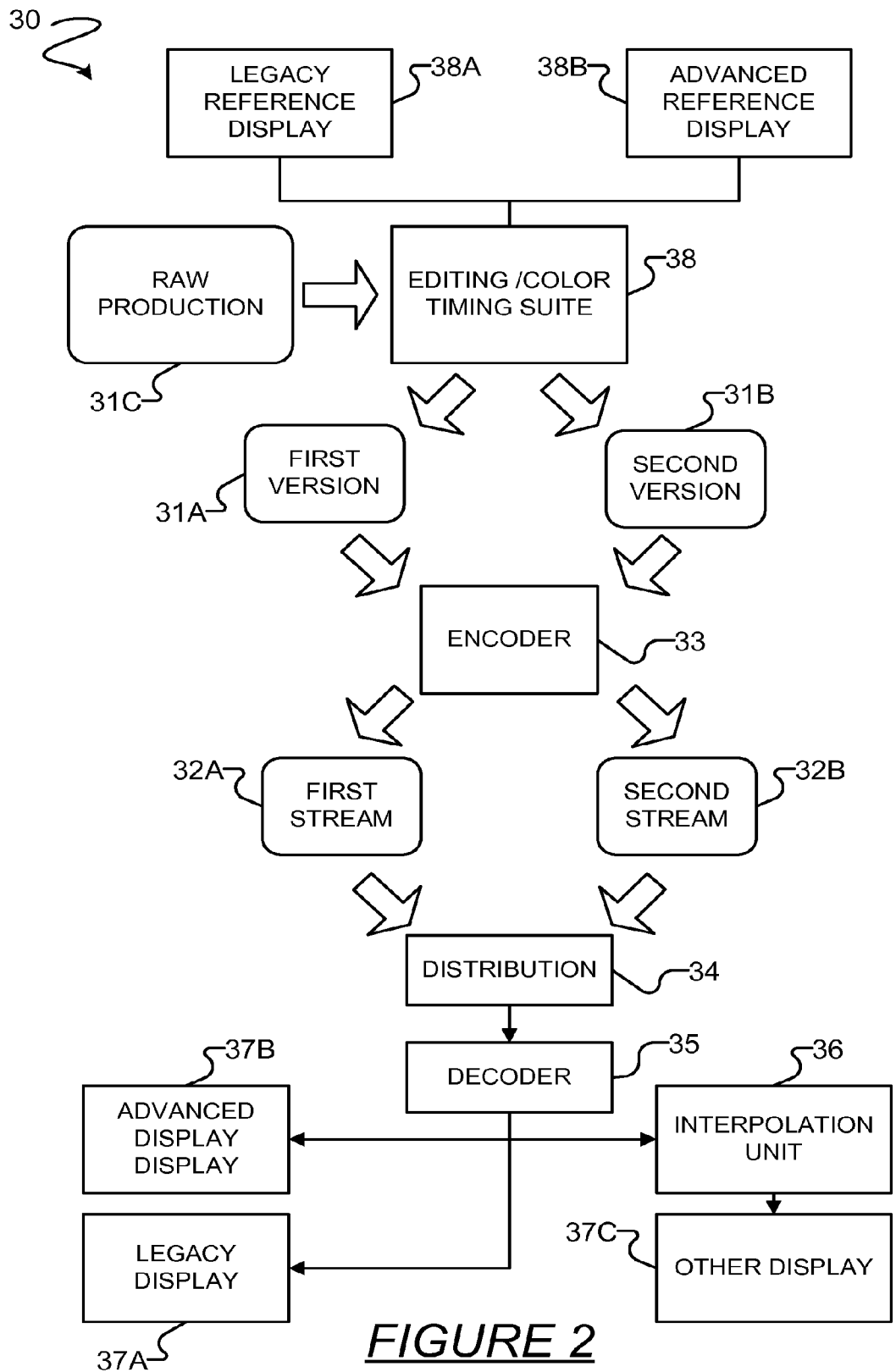
FIG. 2 shows schematically a simplified example distribution pipeline for video or other image data.

FIG. 2 shows schematically a simplified example distribution pipeline 30. Two versions 31A and 31B of a video production are produced in a studio environment. Each version represents the same original video content (a feature film for example). The versions are produced from suitable input media 31C. In some embodiments, one of the versions is produced first and one or more other versions are produced by modifying the first-produced version.

In the illustrated embodiment, first and second versions 31A and 31B are respectively color timed and/or approved for distribution using an editing/color timing suite 38 equipped with reference displays 38A and 38B. Reference displays 38A and 38B may optionally be combined in a single display that can operate in different modes. The versions are encoded for distribution by encoder 33. Encoder 33 provides first output 32A and second output 32B. The outputs may, for example, comprise streams, files, or other data structures in which image data can be distributed. In this example, the outputs of encoder 33 are streams 32A and 32B that can be distributed over a distribution channel 34.

In an example embodiment, encoder 33 processes first version 31A into a backward-compatible first video stream 32A. First video stream 32A is viewable on legacy display devices (e.g. televisions that are not configured to generate a signal for display based on both first and second input image data as described herein). Encoder 33 processes second version 31B into a second stream 32B. Second version 31B has been color graded using an advanced display that can render the enhanced colors and dynamic range represented in the VDR data format. VDR stream 32B may be carried alongside main stream 32A in a side channel that is ignored by legacy displays. Legacy display devices and associated peripherals can decode and use backward compatible main video stream 32A. Advanced displays or peripherals may decode VDR stream 32B (or both main stream 32A and VDR stream 32B) and use additional tone and/or color information in VDR stream 32B to provide enhanced images for display to viewers.

Distribution channel 34 may comprise a data communication network (such as a local area network, wide area network, the internet, a cellular data network, a wireless network, or the like); media (such as DVDs, flash memory, portable data stores, magnetic or optical data storage media or the like); or a bus or other data communication link within a system, for example. All that is necessary is for the outputs carrying the image information for first and second input image data to be made available. In this example, the information is made available in the form of streams 32A and 32B.

The distributed information is decoded by a decoder 35 to recover first and second streams 32A and 32B. First stream 32A may be provided to a legacy display 37A for viewing. Second stream 32B may be provided to an advanced display 37B for viewing. To obtain an optimum viewing experience at another display 37C, first and second streams 32A and 32B are provided to an interpolator 36 which produces an interpolated and/or extrapolated stream for display on the other display 37C.

In some embodiments, a backward-compatible first video stream 32A is used as first input image data 14A and a VDR stream 32B (or a VDR stream obtained by combining VDR stream 32B with first backward compatible video stream 32A) is used as second input image data 14B.

Interpolation of brightness (Y) values may be performed based upon the maximum Y values represented in first and second input image data 14A and 14B (or the maximum Y values that first and second input image data 14A and 14B are capable of encoding; or maximum Y values specified in or implied by metadata associated with first and second input image data 14A and 14B) as well as maximum Y values of which target display 20 is capable. For example, the interpolation parameter α of Equation (2) may be given by:

$$\alpha = \frac{\log(\max(Y_{VDR})) - \log(\max(Y_{TARGET}))}{\log(\max(Y_{VDR})) - \log(\max(Y_{LDR}))} \quad (55)$$

where: max (YVDR) is the maximum value for Y that can be specified in the VDR (higher-capability) video signal, max YLDR is the maximum value for Y that can be specified in the LDR (lower-capability) video signal, and max (YTARGET) is the maximum value for Y that can be reproduced on the target display. β may be given by β=1−α.

In some embodiments, α is chosen such that output image data 18 has a geometric mean having a predetermined relationship with a geometric mean of the one of first and second input image data 14A and 14B having the greater dynamic range (in this example second input image data 14B). In such embodiments, the geometric mean of the second input video data may be determined for a frame or scene. A target geometric mean for the output video data 18 may be determined from the geometric mean of the second input video data. A value for α that causes the output video data for the frame or scene to have the desired target geometric mean may then be selected.

Determining interpolation parameters for chroma values can be more complicated than determining interpolation parameters for luminance values. The following discussion explains some methods for determining parameters appropriate for interpolation of chroma values using a geometric model. Although the geometric model serves as a useful aid to understanding the disclosed methods, those of skill in the art will understand that in most embodiments, such methods will be applied using logic circuits and/or software that perform calculations equivalent to the described geometric manipulations and further that there are a wide variety of alternative ways to arrange such calculations that are equivalent because they produce essentially the same results.

Figure 3:
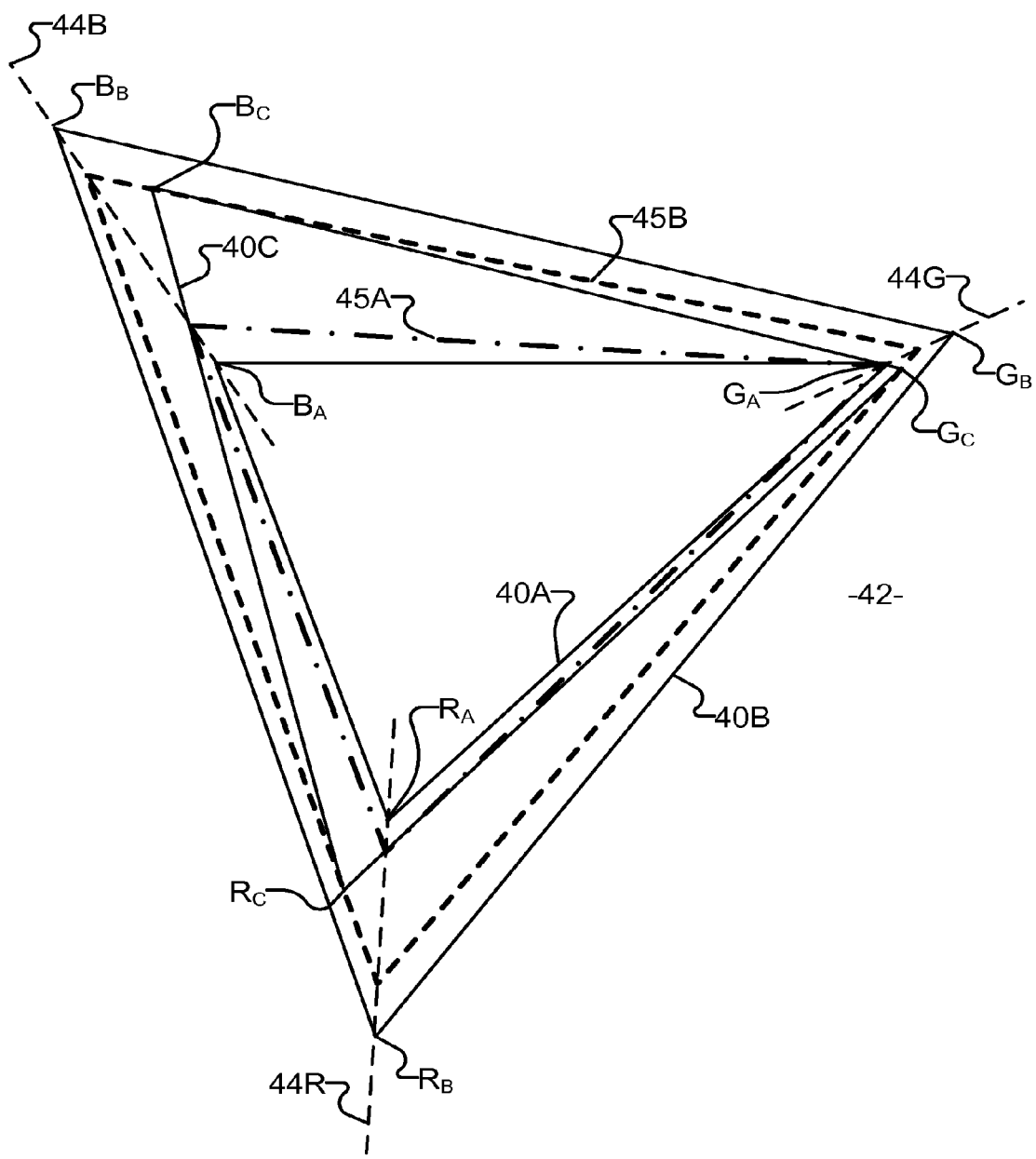
FIG. 3 is an exaggerated schematic view showing a relationship between first and second gamuts associated with first and second image data and a target gamut in a color space.

In this example red (R), green (G) and blue (B) primary colors of target display 20 are different from the corresponding primaries assumed for first and second input image data 14A and 14B. This is illustrated by FIG. 3 which shows an exaggerated case where: first input image data 14A is color timed for display on a display having primaries RA, GA and BA; second input image data 14B is color timed for display on a display having primaries RB, GB and BB; and target display 20 has primaries RC, GC and BC.

Each set of primaries forms a triangle (shown as triangles 40A, 40B, and 40C, collectively triangles 40) in a constant luminance plane 42 in which different chromaticities can be specified by pairs of coordinates that identify points in the plane 42. Each triangle 40 corresponds to a gamut. Points outside of a triangle 40 are out-of-gamut meaning that they have colors that cannot be faithfully reproduced by using the primaries corresponding to the triangle 40.

Lines 44R, 44G and 44B can be constructed that respectively join corresponding corners of triangles 40A and 40C. Lines 44 may be called 'primary interpolation lines'. One reason why establishing interpolation parameters for chromaticity values is complicated is that the corners of triangle 40C do not necessarily lie on the corresponding lines 44. Even in a particular case where the corners of triangle 40C do lie on lines 44, the corners of triangle 40C will most typically lie at different relative positions along the corresponding lines 44.

One approach generates a new gamut having primaries lying along lines 44. The new gamut is defined in such a manner that chromaticity values for a point in the new gamut may be determined by interpolation between corresponding points in the first and second image data. The new gamut can be selected to balance coverage of the target gamut (i.e. the proportion of triangle 40C that is included in the new gamut) against the proportion of chromaticity values that would be placed out of the target gamut 40C by the interpolation (e.g. the proportion of the new gamut that falls outside of the target gamut 40C).

Figure 4:
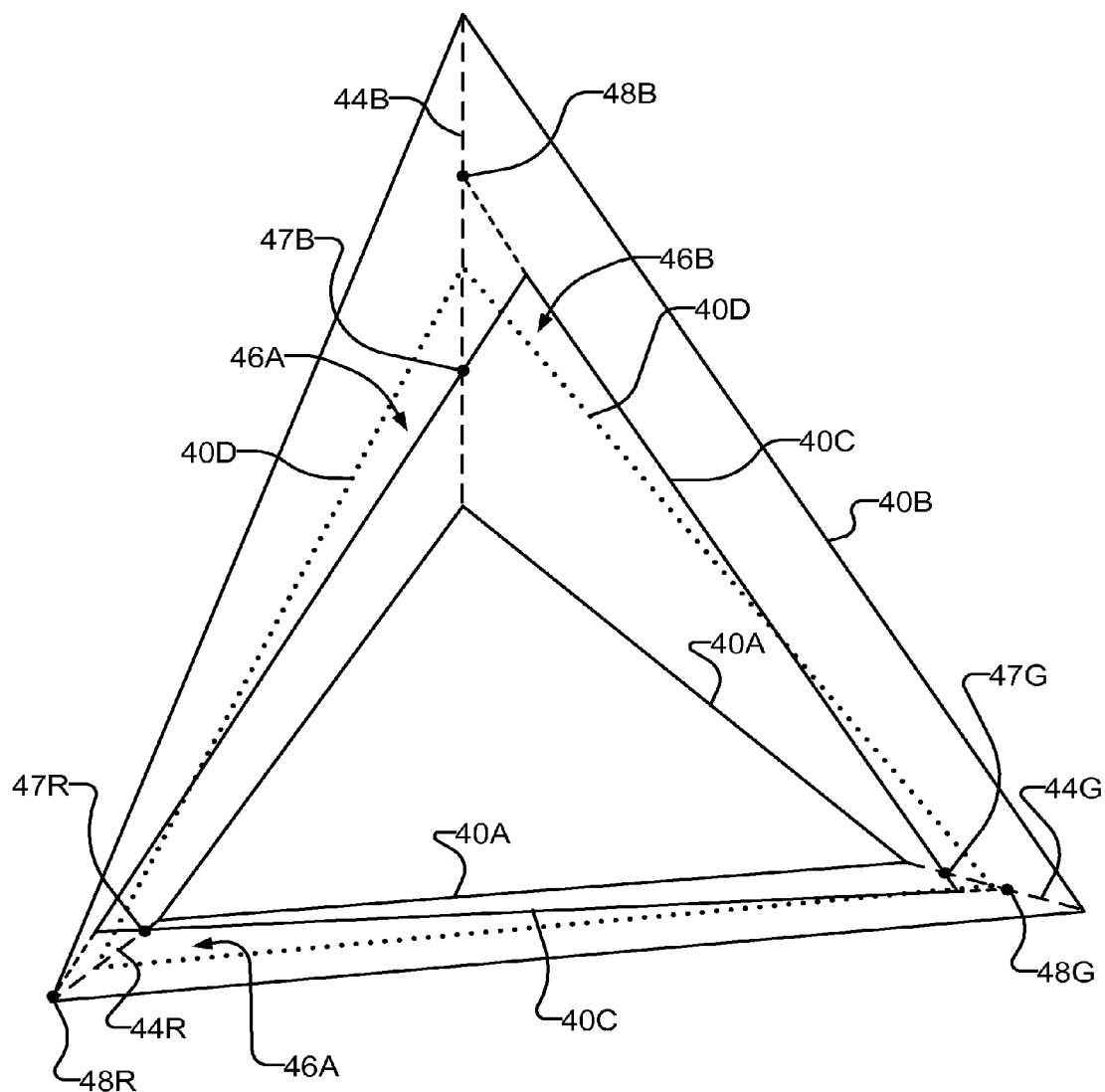
FIG. 4 is a schematic drawing illustrating one way to establish intersection points that determine primaries for first and second bracketing gamuts.

In FIG. 4 a new gamut 40D is indicated by a dashed line. The corners (primaries) of new gamut 40D each lie on a corresponding one of lines 44. The corners of gamut 40D are all the same proportion of the distance along the corresponding line 44 relative to an origin point. The origin point may, for example, comprise a primary of gamut 40A or 40B.

A suitable gamut 40D for use in interpolation can be established by picking primaries that lie on lines 44. FIG. 4 illustrates one method for defining new gamut 40D. The method involves defining first and second bracketing gamuts that bracket target gamut 40C. The first bracketing gamut may be defined such that the first bracketing gamut is contained within target gamut 40C. The second bracketing gamut may be defined such that the second bracketing gamut contains target gamut 40C. The first and second bracketing gamuts may both be defined such that their primaries (corners) are constrained to lie on primary interpolation lines 44.

As shown in FIG. 3 one can define a first bracketing gamut 45A that is the largest gamut that is: completely contained within target gamut 40C; and has corners lying on lines 44. One can also establish a second bracketing gamut 45B that is the smallest gamut that: completely contains target gamut 40C and also has corners lying on lines 44.

In some embodiments, the locations of primaries of the interpolation gamut 40D on the corresponding primary interpolation lines 44 are chosen such that the distances of the primaries from reference points on the interpolation lines 44 are in proportion to the lengths of primary interpolation lines 44 between gamuts 40A and 40B. Example reference points are primaries of gamut 40A, primaries of gamut 40B, reference points that are a predetermined portion of the way between corresponding primaries of gamuts 40A and 40B etc. For example, consider the case where: DR is a distance between primaries RA and RB; DG is a distance between primaries GA and GB; and DB is a distance between primaries BA and BB. Then the primaries of an interpolation gamut may be located at distances DBR, DBG and DBB from the corresponding reference points on primary interpolation lines 44 such that DBR/DR=DBG/DG=DBB/DB.

The particular proportion of the way along primary reference lines 44 which sets locations of the primaries of gamut 40D may be determined based on locations of primaries of the bracketing gamuts 45A and 45B. In some embodiments the proportion is determined based on the smallest proportion for any primary of the second bracketing gamut 45B and the largest proportion for any primary of the first bracketing gamut 45A.

For example, the primaries for interpolation gamut 40D may be located at a proportion of the distance along the corresponding primary interpolation lines 44 wherein the proportion is a predetermined fraction of the way between the smallest proportion for any primary of the second bracketing gamut 45B and the largest proportion for any primary of the first bracketing gamut 45A. In some embodiments the predetermined fraction is ½.

Larger fractions favor improved utilization of the target gamut at the expense of the possibility that more interpolated values will be out-of-gamut for the target display. Smaller fractions favor a reduced proportion of the possible interpolated values being outside of target gamut 40C at the expense of reduced utilization of target gamut 40C. In some embodiments the fraction is based on the interpolation parameters determined for a luminance channel as described above with relation to Equation (5) for example. Interpolation parameters for color channels may be determined from the primaries of gamut 40D as described below.

In some embodiments, the fraction is determined by iterative processing of an image or scene. In such embodiments, interpolation may be performed for various values of the fraction. The output signal is checked for out-of-gamut pixel values (e.g. values falling outside of target gamut 40C. If a condition relating to the degree to which the output signal contains out-of-gamut pixel values is not satisfied then the fraction may be reduced and the interpolation performed again with interpolation parameters based on the reduced fraction. This procedure may be iterated until a value for the fraction is found for which the corresponding interpolation parameters result in output video data for which the condition is satisfied. Example conditions that may be used include: no pixels are out-of-gamut in the output signal; fewer than a threshold number or proportion of pixels in the output signal have out-of-gamut pixel values; no pixel values in the output signal are out-of-gamut by more than a threshold amount; fewer than a threshold number or proportion of pixels in the output signal have pixel values that are out-of-gamut by more than a threshold amount; combinations of the above; etc.

In FIG. 4, 46A indicates portions of gamut 40D that are outside of target gamut 40C. 46B indicates a portion of target gamut 40C that is not used because it is outside of gamut 40D. In some embodiments the fraction used to determine the size of gamut 40D is selected to make the area of portion 46A equal the area of portion 46B.

In some alternative embodiments the primaries of bracketing gamuts 45A and 45B may be constrained to lie at the same proportional distances along primary interpolation lines 44. In such embodiments the proportions for all primaries of the first bracketing gamut are the same and the proportions for all primaries of the second bracketing gamut are the same and so it is not necessary to determine the largest or smallest proportions for any primary of the first or second bracketing gamuts 45A, 45B.

In other alternative embodiments the particular proportion which sets locations of the primaries of gamut 40D along primary interpolation lines 44 is determined based on averages (which may be weighted averages) of the locations of primaries of the bracketing gamuts 45A and 45B. For example, in some embodiments the locations of the primaries of gamut 40D along lines 44 are based on the averages of the proportions for the two primaries of the second bracketing gamut 45B located at the smallest proportions of the way along the corresponding primary interpolation lines 44 and the averages of the proportions for the two primaries of the first bracketing gamut 45A located at the largest proportions or the way along the corresponding primary interpolation lines 44.

In some cases the locations of the primaries of interpolation gamut 40D may be defined relative to ratios based on the locations of reference points on primary interpolation lines 44. For example, each point on primary interpolation lines 44 may be characterized by a ratio of the distance from gamut 40A along the line 44 to the distance from gamut 40B along the line 44. In general, each of the three points at which each bracketing gamut 45A or 45B intersects lines 44 corresponds to a value of this ratio. The method may identify the smallest ratio for second bracketing gamut 45B and the largest ratio for first bracketing gamut 45A. Primaries of interpolation gamut 40D may be located at positions along primary interpolation lines 44 corresponding to a ratio that is an average or weighted average of the smallest ratio for second bracketing gamut 45B and the largest ratio for first bracketing gamut 45A.

FIG. 4 illustrates graphically one way to establish points that determine first bracketing gamut 45A and second bracketing gamut 45B. Two intersection points are located along each line 44. First intersection points 47R, 47G and 47B are respectively located at the intersections of a corresponding line 44 with triangle 40C. Second intersection points 48R, 48G and 48B are respectively located at the intersections between a corresponding line 44 and an extension of an edge of triangle 40C. The positions of intersection points 47 and 48 may be specified by absolute coordinates or as locations relative to the length of the line 44 between the primaries of gamuts 40A and 40B. Such proportions may be represented in various ways.

An interpolation parameter may be derived from first and second gamuts 45A and 45B by taking the proportion corresponding to the first intersection point 47 for which the proportion of the way along line 44 outwardly from gamut 40A is greatest (in the FIG. 4 example 47B) and taking the proportion corresponding to the second intersection point 48 for which the proportion of the way along line 44 outwardly from gamut 40A is least (in the FIG. 4 example 48G) and finding a proportion that is a fraction of the way between these proportions (for example ½ way between). Interpolation parameters may be determined from this proportion.

By way of example, if the proportion along line 44 is given by a value in the range of 0 to 1 with a value of 0 corresponding to the primary of first gamut 40A on the line 44 and a value of 1 corresponding to the primary of second gamut 40B on line 44 then an interpolation parameter β from Equations (3) and (4) may be given by the proportion and the interpolation parameter α may be given by (1−β).

Figure 5:
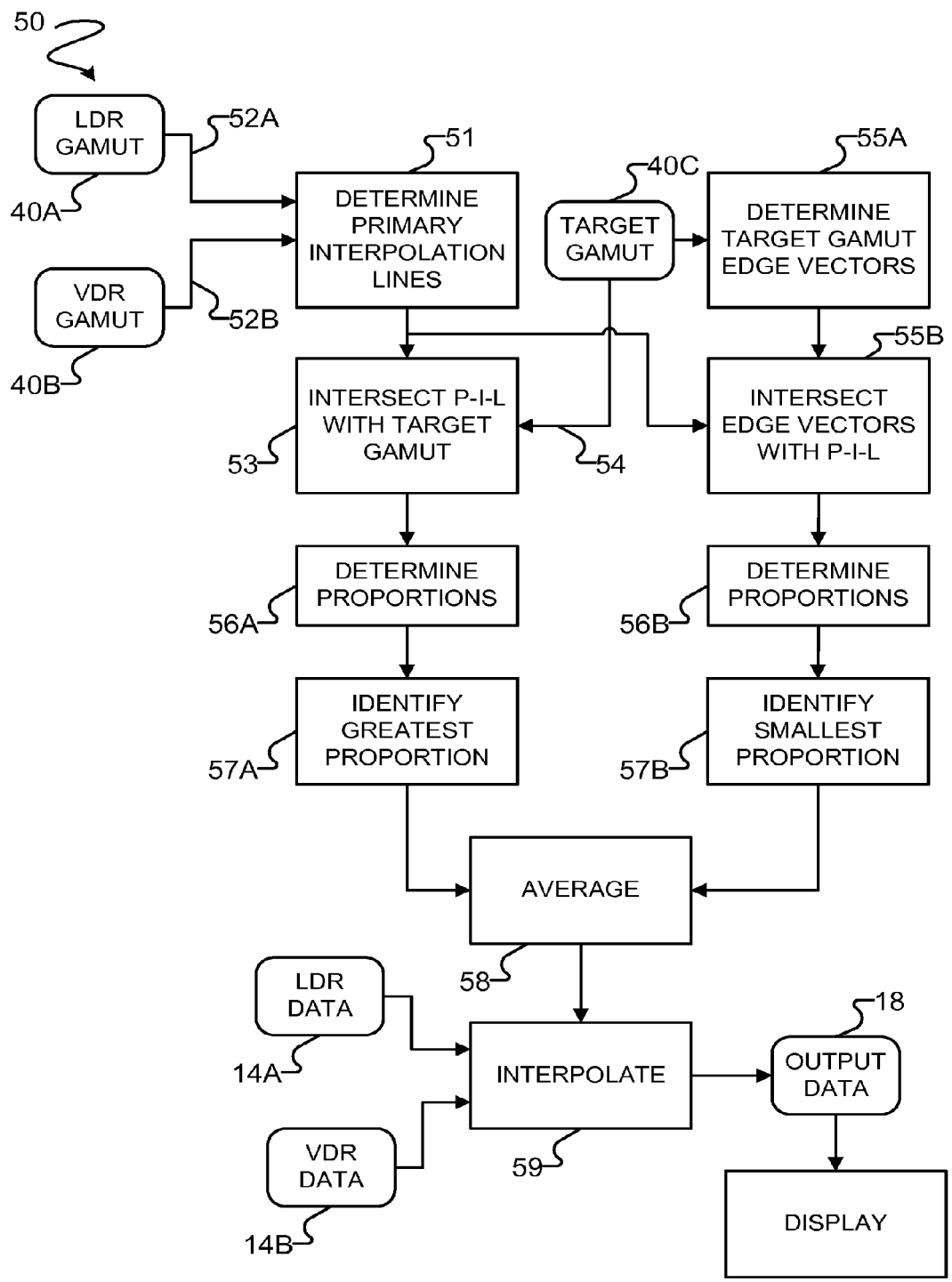
FIG. 5 is a flow chart illustrating a process for establishing and applying an interpolation coefficient for interpolating chromaticity.

FIG. 5 illustrates a process 50 for establishing and applying an interpolation coefficient for interpolating chromaticity. Block 51 calculates primary interpolation lines 44 based on gamuts (e.g. 40A and 40B) specified by information 52A, 52B derived from or associated with first and second image data 14A and 14B. In some embodiments metadata associated with first and second image data 14A and 14B comprises information that specifies primary interpolation lines 44 as determined at or prior to distribution of the first and second image data 14A and 14B. Gamuts 40A and 40B may be derived from pixel values contained in first and second image data 14A and 14B respectively, determined based on a gamut of displays on which first and second image data 14A and 14B were prepared or approved, for example.

Block 53 finds intersections of primary interpolation lines 44 ("P-I-L") and a target gamut (e.g. 40C) specified by information 54 derived from, associated with, or obtained from a target display. The intersections may, for example, be located using line-line intersection tests.

In the illustrated embodiment, block 55A calculates edge vectors of target gamut 40C and block 55B calculates the intersections of the edge vectors with primary interpolation lines 44. Blocks 56A and 56B determine a proportion of the way along the corresponding primary interpolation line for each of the intersection points identified in blocks 53 and 55B respectively. Block 57A identifies the greatest proportion determined by block 56A. Block 57B identifies the smallest proportion determined by block 56B. Block 58 determines an average (which is a weighted average in some embodiments) of the proportions identified in blocks 57A and 57B.

Block 59 performs color interpolation between first and second image data 14A and 14B using an interpolation parameter a based on the average determined by block 58 to produce output image data 18. For example, where the Yuv color space is being used, the color coordinates u and v may be interpolated according to:

$$u_{OUT} = \alpha u_{IN1} + (1-\alpha) u_{IN2} \quad (6)$$

$$v_{OUT} = \alpha v_{IN1} + (1-\alpha) v_{IN2} \quad (77)$$

The general approach described above may be applied to extrapolation as well as interpolation. For example, where a target gamut exceeds the gamuts of both first image data 14A and second image data 14B primary interpolation lines may be extended and first and second gamuts may be constructed that are respectively the smallest gamut that entirely contains the target gamut and the largest gamut that fit entirely within the target gamut such that the corners of the first and second gamuts lie on the extended primary interpolation lines and are all the same proportion of the way along the primary interpolation lines.

Techniques as described herein may optionally be applied in cases having more than two sets of source image data. For example, one could configure and perform separate interpolation/extrapolation as described herein for two or more pairs of source data and average the resulting pixel values. In some embodiments, separate interpolation/extrapolation may be performed for every combination of source image data.

In some embodiments, one pair of source image data is selected from among a plurality of possible pairs using the selection criterion that the primaries of the target gamut lie closest, on average, to the primary interpolation lines for the selected pair of source image data.

Some options that may be applied in cases where it is desired to take advantage of the availability of more than two sets of source image data are:

taking every pair of source image data (or a plurality of pairs of source data) and performing a two-source interpolation (as described above) on each pair and then averaging the pixel values resulting from the different interpolations. For example, three sets of source image data can be paired in 3 ways. The method described above may be repeated for each pair to obtain three results for each pixel value. The three results may be averaged to obtain an output value.

taking every pair of source image data (or a plurality of pairs of source data) and performing a two-source interpolation (as described above) on each pair and then selecting one of the interpolated values as an output value. For example, one could select as an output value the one interpolated value that comes closest to the target gamut.

in a first stage, taking every pair of source image data (or a plurality of pairs of source data) and performing a two-source interpolation (as described above) on each pair to yield a plurality of interpolated values. In another stage, perform a similar interpolation on the interpolated values from the first stage. Continue iterating in successive stages until a single interpolated result is produced.

Figure 6:
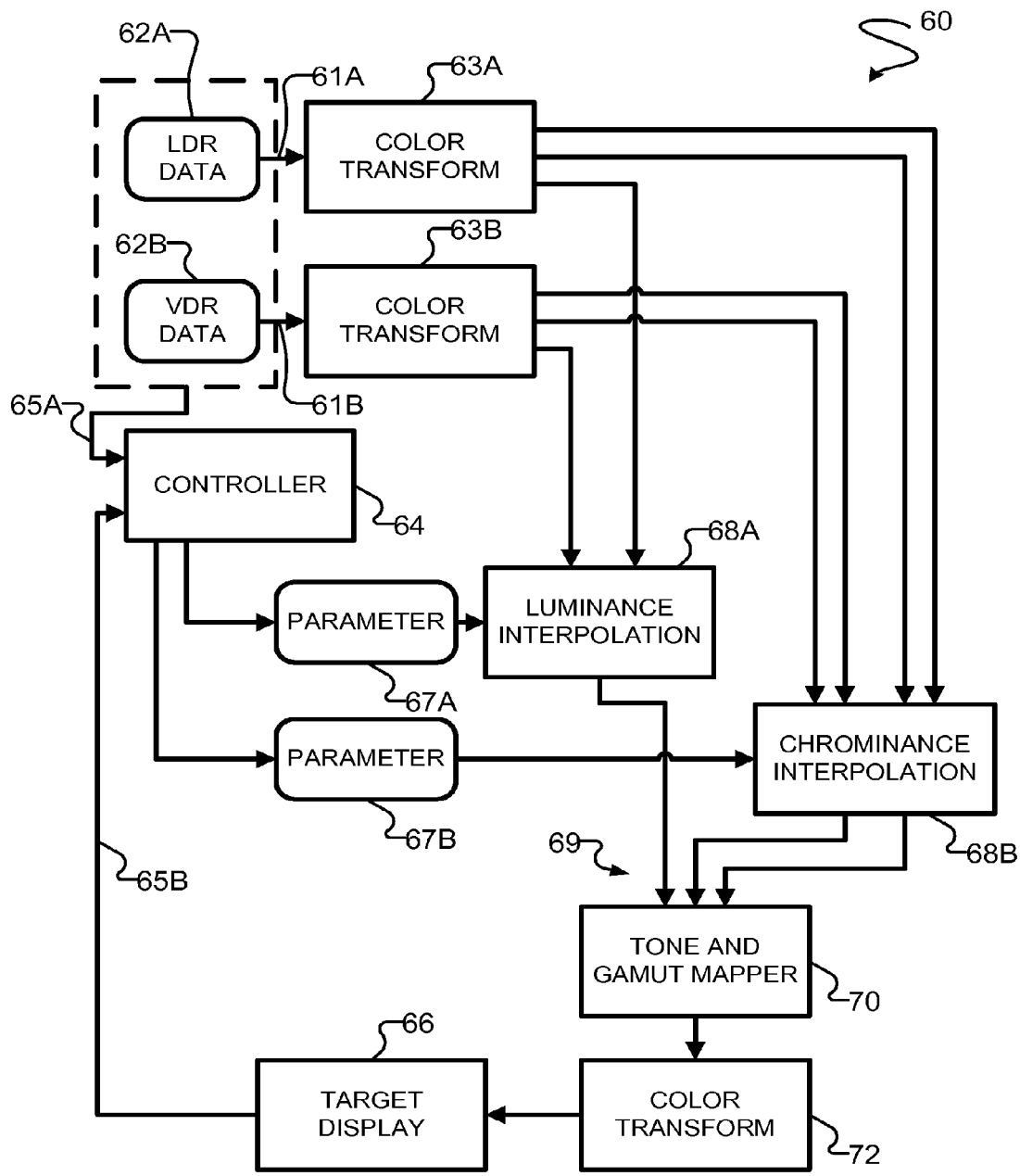
FIG. 6 is a block diagram showing a display system according to one example embodiment.

FIG. 6 illustrates a display system 60 according to one embodiment. Display system 60 has first and second inputs 61A and 61B (inputs 61A and 61B are not necessarily physically distinct). First input 61A may be connected to receive first image data such as a LDR video stream 62A. Second input 61A may be connected to receive second image data such as a VDR video stream 62B. First and second image data depict the same content (e.g. the same scenes and objects).

First and second color space transformers 63A and 63B respectively convert video streams 62A and 62B into a common color format. One or both of color space transformers 63A and 63B may be omitted if one or both of video streams 62A and 62B is already in the desired common color format. In the illustrated embodiment the common format has a luminance channel and a plurality of color channels.

A controller 64 is connected to receive information 65A regarding the first and second video streams 62A and 62B and information 65B regarding the capabilities of a target display 66. Information 65A may be derived from analysis of the data of video streams 62A and 62B (e.g. determining ranges of pixel values for a frame, sequence of frames, selected frames etc. of video streams 62A and 62B); retrieving or extracting metadata associated with video streams 62A and 62B, the metadata containing information indicative of the gamut and/or other ranges of allowable pixel values for video streams 62A and 62B and/or the capabilities of display(s) on which video streams 62A and 62B were color graded and/or approved for distribution. Information 65A and/or 65B may be derived from user inputs in the alternative.

Controller 64 determines interpolation parameters for example as described above. In the illustrated embodiment the interpolation parameters include at least one luminance interpolation parameter 67A and at least one color interpolation parameter 67B. Interpolation system 68A performs interpolation between corresponding luminance values from first and second video streams 62A and 62B to yield a luminance value for an output video stream 69. Interpolation system 68B performs interpolation between corresponding chromaticity values from first and second video streams 62A and 62B to yield chromaticity values for output video stream 69.

Tone and gamut mapping unit 70 adjusts pixel values in output video stream 69 to be within the gamut of target display 66. Mapping unit 70 may, for example, be configured to clip out-of-gamut pixel values to the gamut boundary of target display 66. Mapping unit 70 may, by way of non-limiting example, be constructed as described in U.S. patent application No. 61/334,249 filed on 13 May 2010 and entitled GAMUT ADJUSTMENT METHODS AND APPARATUS and U.S. patent application No. 61/352,444 filed on 8 Jun. 2010 and entitled TONE AND GAMUT MAPPING METHODS AND APPARATUS which are both hereby incorporated herein by reference. Color space converter 72 maps the output video stream 69 into a color space of target display 66. In some embodiments the order of mapping unit 70 and color space converter 72 is reversed.

An alternative or in addition to providing a mapping unit 70 following interpolation systems 68A and 68B, one can optionally perform gamut and/or tone mapping of one or both of first and second input image data 14A and/or 14B into a display range of the target display prior to performing color interpolation and then perform color interpolation on the resulting color values (the term 'color values' includes luminance values unless otherwise specified). This alternative approach can have the advantage that the color values resulting from the interpolation can be guaranteed to be within the display range of the target display.

In some embodiments display system 60 incorporates functionality for adjusting the black point of the output video stream 69. If the black level of target display 66 is not taken into account then black crushing may occur in some cases.

One way to adjust values in output video stream 69 to take account of the black point of target display 66 is to perform a luminance mapping as follows:
where Lb is the black level of target display 66 and LDRIVE is given by:

$$L_{DRIVE} = \begin{cases} \dfrac{L_S^2}{4L_b} & L_S \le 2L_b \\ L_S - L_b & L_S > 2L_b \end{cases} \quad (88)$$

where LS is the unadjusted ideal output luminance.

The methods and apparatus described herein are not limited to the case where color gamuts are defined by three primaries. These methods and apparatus may be applied in cases where gamuts have a different number of primaries, for example four or more. Where each gamut has the same number of primaries, for example four primaries, the methods described above may be generalized without difficulty. Primary interpolation lines may be defined such that one primary interpolation line extends between each pair of corresponding primaries of the gamuts of the first and second input image data. There may be the same number of primary interpolation lines as there are primaries in the gamuts.

The methods may also be applied in cases where the color gamuts associated with the first and second input image data 14A and 14B have different numbers of primaries. For example, one can reduce the number of primaries defining a gamut by creating virtual primaries. For example consider a situation where: first input image 14A is associated with a gamut having 3 primaries; second input image data 14B is associated with a gamut having 4 primaries (e.g. two different greens), and the target gamut has 3 primaries. The gamut of second input image data 14B could be replaced for purposes of interpolation with an equivalent 3-primary gamut created by introducing a virtual primary located at a chromaticity point selected so that the equivalent 3-primary gamut just includes the two original green primaries. This could be done by extending the gamut boundaries joining each of the greens to another primary and placing the virtual primary at the intersection of the extended boundary lines.

The methods and apparatus described herein may also be applied to non-opponent color spaces. An example method suitable for use with non-opponent color spaces comprises: if the input images and target display capabilities are not defined in terms of a common color space, converting at least one of the input images and the target display capabilities so that the input images and target display capabilities are defined in terms of the common color space, determining the maximum luminances of the common color space input images and a maximum target display luminance, determining interpolation parameters based on the maximum luminances of the input images and the maximum target display luminance, and applying the determined interpolation parameters to all channels of the common color space input images to yield a combined image in the common color space.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for generating an output image for display on a target display associated with a target gamut, the method comprising:
  obtaining first and second image data depicting the image, the first and second image data respectively associated with first and second gamuts;

determining primary interpolation lines through corresponding pairs of primaries of the first and second gamuts;

generating first and second bracketing gamuts, the first and second bracketing gamuts having primaries on the primary interpolation lines, the first bracketing gamut containing the target gamut and the second bracketing gamut contained within the target gamut;

generating a first interpolation parameter based on the locations of the primaries of the bracketing gamuts along the primary interpolation lines; and, generating the output image by interpolating between chrominance values of the first and second image data using the first interpolation parameter;

wherein the method is performed by one or more computing devices.

2. A method according to claim 1 wherein the first bracketing gamut is a smallest gamut having primaries on the primary interpolation lines that entirely contains the target gamut.

3. A method according to claim 2 wherein the second bracketing gamut is a largest gamut having primaries on the primary interpolation lines that is contained within the target gamut.

4. A method according to claim 3 wherein generating the first interpolation parameter comprises determining a first value based on a minimum proportion of a distance along the primary interpolation lines for the primaries of the first bracketing gamut and determining a second value based on a maximum proportion of a distance along the primary interpolation lines for the primaries of the second bracketing gamut and determining the first interpolation parameter based at least in part on the first and second values.

5. A method according to claim 4 wherein determining the first interpolation parameter comprises averaging the first and second values.

6. A method according to claim 5 comprising identifying pixels in the output image data that are outside of the target gamut and adjusting values of such pixels to be in the target gamut.

7. A method according to claim 6 wherein adjusting the values of the pixels comprises clipping values of the pixels to a boundary of the target gamut.

8. A method according to claim 5 comprising transforming the output image data to a RGB format native to the target display for which the target gamut is defined by maximum values for R, G, and B coordinates wherein the adjusting comprises clipping pixel values to the corresponding maximum values for the R, G, and B coordinates.

9. A method according to claim 5 comprising representing the first and second input image data in a format wherein pixel values comprise a luminance value and a pair of chrominance values and wherein the method comprises generating luminance values for the output image data by interpolating between corresponding luminance values of the first and second image data.

10. A method according to claim 1 comprising representing the first and second input image data in a format wherein pixel values comprise a luminance value and a pair of chrominance values and wherein the method comprises generating luminance values for the output image data by interpolating between corresponding luminance values of the first and second image data using a luminance interpolation parameter.

11. A method according to claim 10 comprising performing interpolating between corresponding chrominance values of the first and second image data using a chrominance interpolation parameter different from the luminance interpolation parameter.

12. A method according to claim 11 comprising receiving metadata specifying the first and second gamuts.

13. A method according to claim 11 wherein one or more primaries of the target gamut do not lie on any of the primary interpolation lines.

14. A method according to claim 1 comprising receiving metadata specifying the first and second gamuts.

15. An image processing apparatus comprising:

an interpolator, implemented at least partially in hardware, that is configured to generate chromaticity values for output image data by interpolating between corresponding chromaticity values for first and second input image data according to a first interpolation parameter; and, an interpolation parameter calculator, implemented at least partially in hardware, that is configured to determine the first interpolation parameter based on first and second gamuts respectively associated with the first and second image data and on a target gamut associated with a target display.

16. An image processing apparatus according to claim 15 wherein the interpolation parameter calculator is configured to determine the first interpolation parameter by:

determining primary interpolation lines through corresponding pairs of primaries of the first and second gamuts;

generating first and second bracketing gamuts, the first and second bracketing gamuts having primaries on the primary interpolation lines, the first bracketing gamut containing the target gamut and the second bracketing gamut contained within the target gamut; and generating the first interpolation parameter based on the locations of the primaries of the bracketing gamuts along the primary interpolation lines.

17. An image processing apparatus according to claim 16 comprising one or more inputs for receiving the first and second image data, the apparatus comprising a color space converter configured to convert the first and second image data into a common color space.

18. An image processing apparatus according to claim 17 wherein the common color space comprises a color space in which pixel values comprise a luminance value and a plurality of chrominance values.

19. An image processing apparatus according to claim 18 wherein the first bracketing gamut is a smallest gamut having primaries on the primary interpolation lines that entirely contains the target gamut.

20. An image processing apparatus according to claim 19 wherein the second bracketing gamut is a largest gamut having primaries on the primary interpolation lines that is contained within the target gamut.

21. An image processing apparatus according to claim 20 wherein the interpolation parameter calculator is configured to generate the first interpolation parameter by:

determining a first value based on a minimum proportion of a distance along the primary interpolation lines for the primaries of the first bracketing gamut and determining a second value based on a maximum proportion of a distance along the primary interpolation lines for the primaries of the second bracketing gamut and determining the first interpolation parameter based at least in part on the first and second values.

22. An image processing apparatus according to claim 21 wherein the interpolation parameter calculator is configured to generate the first interpolation parameter by averaging the first and second values.

23. An image processing apparatus according to claim 16 comprising a gamut mapping unit connected to receive the output image data and to map pixel values in the output image data for pixels that are out-of-gamut for the target gamut into the target gamut.

* * * * *